US012620680B2

(12) United States Patent
Saito

(10) Patent No.: US 12,620,680 B2
(45) Date of Patent: May 5, 2026

(54) JOINING METHOD, JOINING STRUCTURE, AND BATTERY

(71) Applicant: TOYOTA BATTERY CO., LTD., Kosai (JP)

(72) Inventor: Shigeki Saito, Hamamatsu (JP)

(73) Assignee: TOYOTA BATTERY CO., LTD., Kosai (JP)

( * ) Notice: Subject to any disclaimer, the term of this patent is extended or adjusted under 35 U.S.C. 154(b) by 561 days.

(21) Appl. No.: 18/215,125

(22) Filed: Jun. 27, 2023

(65) Prior Publication Data

US 2024/0006727 A1 Jan. 4, 2024

(30) Foreign Application Priority Data

Jun. 30, 2022 (JP) ................................. 2022-105934

(51) Int. Cl.
H01M 50/533 (2021.01)
H01M 50/536 (2021.01)
H01M 50/538 (2021.01)

(52) U.S. Cl.
CPC ....... H01M 50/536 (2021.01); H01M 50/533 (2021.01); H01M 50/538 (2021.01)

(58) Field of Classification Search
CPC . H01M 50/533; H01M 50/536; H01M 50/538
See application file for complete search history.

(56) References Cited

U.S. PATENT DOCUMENTS

2002/0061438 A1  5/2002  Inoue et al.
2013/0157095 A1*  6/2013  Ariga .................. H01M 50/553
                                                            429/94
2017/0271709 A1*  9/2017  Umeyama .............. B23K 26/32

FOREIGN PATENT DOCUMENTS

JP        H11-317215 A     11/1999
JP        2000-082487 A    3/2000
JP        2000-133241 A    5/2000
JP        2000-200594 A    7/2000

OTHER PUBLICATIONS

JP Office Action dated Nov. 11, 2025 as received in Application No. 2022-105934.

* cited by examiner

*Primary Examiner* — Kevin E Yoon
(74) *Attorney, Agent, or Firm* — Maschoff Brennan

(57) ABSTRACT

A joining method includes providing an electrode body that includes electrode plate end portions overlapping each other in a thickness-wise direction of the electrode plate end portions; providing a current collector including a folded portion, the folded portion includes two opposing holding walls that hold the electrode plate end portions of the electrode body in between, and a top portion that connects the two holding walls and includes an opening; and welding the electrode plate end portions to end surfaces of the two holding walls that define the opening by irradiating an edge of the electrode plate end portions with a laser beam in a state in which the edge of the electrode plate end portions held between the two holding walls projects into the opening.

10 Claims, 12 Drawing Sheets

Thickness of Each Electrode Plate End (Foil Thickness): d2

Comparative Example

Comparative Example

Comparative Example

Comparative Example

Comparative Example

1

JOINING METHOD, JOINING STRUCTURE, AND BATTERY

BACKGROUND

1. Field

The following description relates to a joining method, a joining structure, and a battery.

2. Description of Related Art

A battery, such as a lithium-ion rechargeable battery, includes an electrode body formed by a stack of positive and negative electrodes and a separator held between the positive and negative electrodes. The electrode body is, for example, accommodated in a case and connected to an external terminal by a current collector that serves as a connecting member.

Japanese Laid-Open Patent Publication Nos. 11-317215 and 2000-200594 describe examples of a battery including an electrode body formed by a roll of electrodes and a separator. Each end of the electrode body is formed by an uncoated portion of an electrode plate where an electrode active material is not applied. Further, the electrode plate end of the positive electrode is arranged at one axial end side of the electrode body, and the electrode plate end of the negative electrode is arranged at the other axial end side of the electrode body. In such a battery, a current collector is joined to each axial end of the electrode body to connect a corresponding one of the positive and negative electrodes to an external terminal.

The current collector includes a folded portion that holds the corresponding electrode plate end that is rolled into layers in a thickness-wise direction between two opposing holding walls. Further, the top of the folded portion includes an opening in the structures disclosed in Japanese Laid-Open Patent Publication Nos. 11-317215 and 2000-200594. The opening is used to laser-weld the electrode plate end held between the two holding walls in the structure disclosed in Japanese Laid-Open Patent Publication No. 2000-200594.

SUMMARY

When joining a current collector to an electrode body, it may be necessary to restrict thermal denaturation of the current collector and the electrode body in addition to maintaining a joining strength between the current collector and the electrode body. In this respect, there is room for improvement in the above described structures known in the art.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a joining method includes providing an electrode body that includes electrode plate end portions overlapping each other in a thickness-wise direction of the electrode plate end portions; providing a current collector including a folded portion, the folded portion includes two opposing holding walls that hold the electrode plate end portions of the electrode body in between, and a top portion that connects the two holding walls and includes an opening; and welding the electrode plate end portions to end surfaces of the two holding walls that define the opening by irradiating an edge of the electrode plate end portions with a laser beam in a state in which the edge of the electrode plate end portions held between the two holding walls projects into the opening.

With the above joining method, the electrode plate end portions may include a slit at a position where the edge of the electrode plate end portions projects into the opening. The slit may extend in a direction in which the edge of the electrode plate end portions projects and open in a projection end of the edge.

With the above joining method, the edge of the electrode plate end portions may include a ridge projecting into the opening. The ridge may increase in projecting amount toward a center of the opening from an end of the opening in a longitudinal direction of the opening that extends along the edge of the electrode plate end portions.

With the above joining method, the two holding walls may include thin portions on the end surfaces of the two holding walls that define the opening.

With the above joining method, the welding may be performed by moving the laser beam in the thickness-wise direction of the electrode plate end portions relative to the edge of the electrode plate end portions.

In another general aspect, a joining structure includes an electrode body, a current collector, and a welded portion. The electrode body includes electrode plate end portions overlapping each other in a thickness-wise direction of the electrode plate end portions. The current collector includes a folded portion and a top portion. The folded portion includes two opposing holding walls that hold the electrode plate end portions of the electrode body in between. The top portion connects the two holding walls and includes an opening. The welded portion connects an edge of the electrode plate end portions, held between the two holding walls, to end surfaces of the two holding walls in a state in which the welded portion projects into the opening from the end surfaces of the two holding walls that define the opening.

With the above structure, the welded portion may have an arch-shaped cross section and connect the end surfaces of the two holding walls in a state in which the welded portion covers the edge of the electrode plate end portions projecting into the opening from the end surfaces of the two holding walls that define the opening.

With the above structure, a portion where the electrode plate end portions are held between the two holding walls may be free from the welded portion.

With the above structure, the two holding walls may include thin portions on the end surfaces of the two holding walls that define the opening.

With the above structure, the electrode plate end portions may include a slit at a position where the edge of the electrode plate end portions projects into the opening. The slit may extend in a direction in which the edge of the electrode plate end portions projects and open in a projection end of the edge.

In another general aspect, a battery includes the above joining structure.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment related to a method for joining a current collector and a joining structure will now be described with reference to the drawings.

Figure 1:
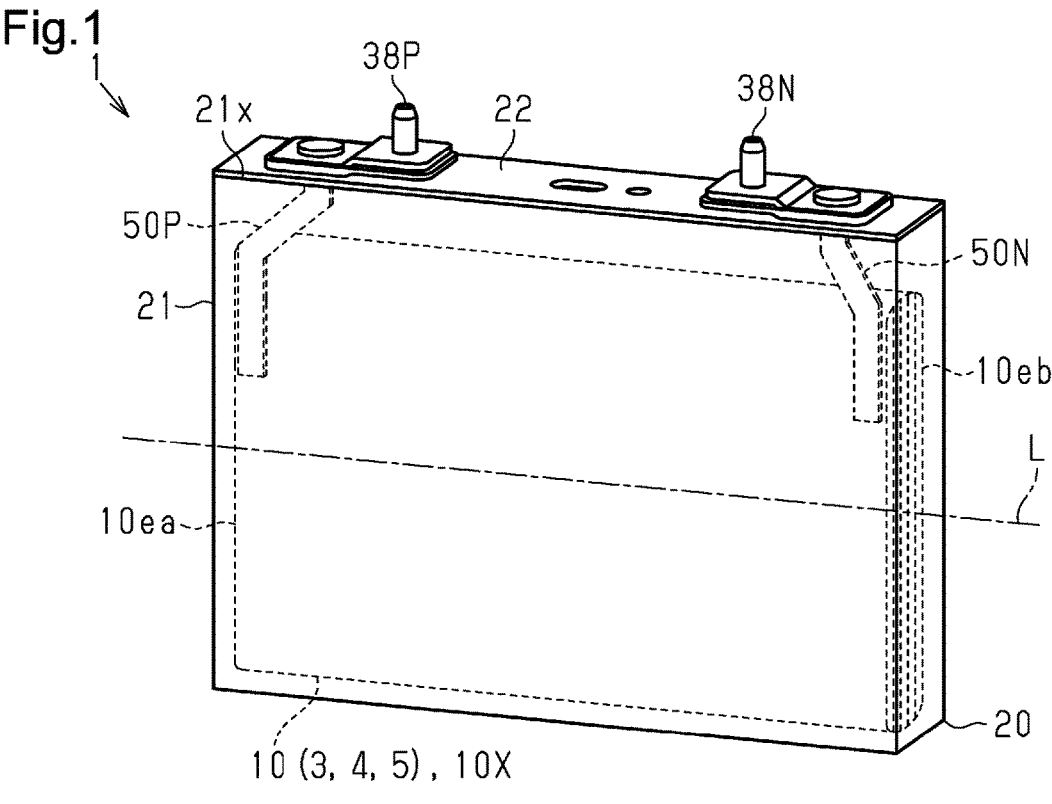
FIG. 1 is a perspective view of a rechargeable battery.

As shown in FIG. 1, a rechargeable battery 1 includes an electrode body 10 and a case 20. A positive electrode 3, a negative electrode 4, and a separator 5 are integrated into the electrode body 10. The case 20 accommodates the electrode body 10. The rechargeable battery 1 has a structure of a lithium-ion rechargeable battery in which the electrode body 10 inside the case 20 is impregnated with a non-aqueous electrolyte (not shown).

Specifically, sheets of the positive electrode 3, the negative electrode 4, and the separator 5 are stacked in the rechargeable battery 1. The stack of the positive electrode 3, the negative electrode 4, and the separator 5 is rolled to form a rolled body 10X in which the positive electrode 3, the negative electrode 4, and the separator 5 are disposed in a radial direction with the separator 5 held in between the electrodes.

Further, the case 20 includes a flat box-shaped case body 21 and a lid 22 that closes an open end 21x of the case body 21. The electrode body 10 serving as the rolled body 10X has a flattened roll shape in correspondence with the box shape of the case 20.

Electrode Sheet and Electrode Body

Figure 2:
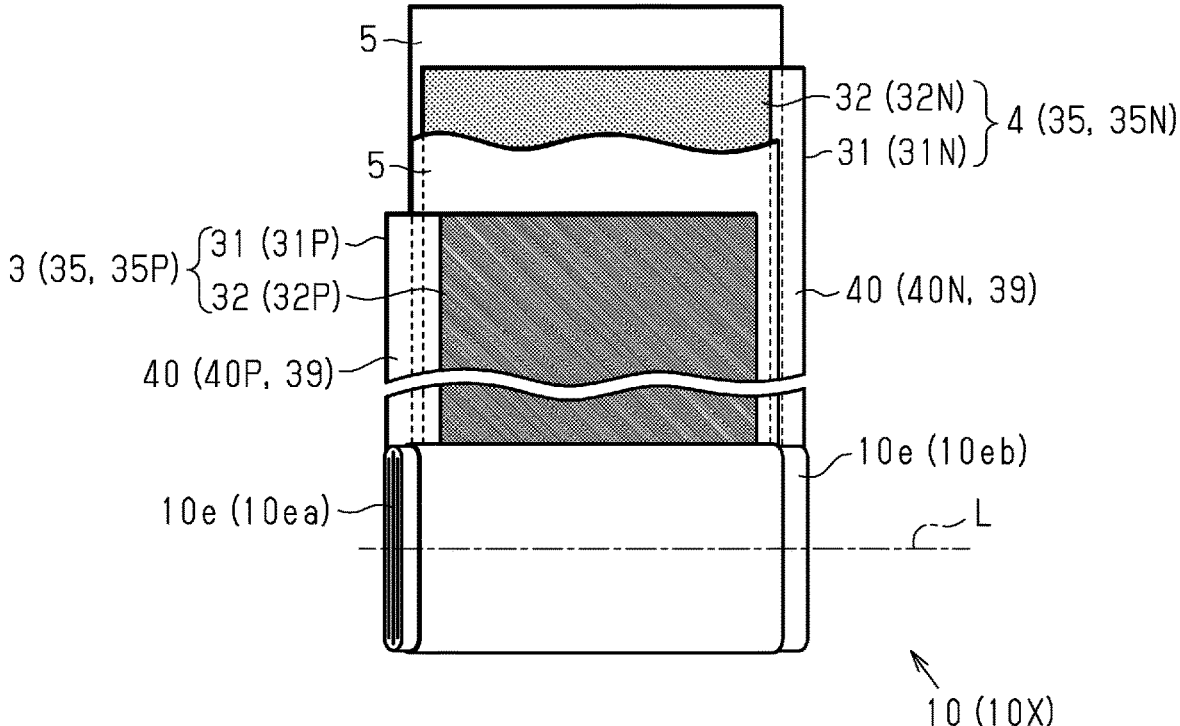
FIG. 2 is an exploded view of an electrode body.

As shown in FIG. 2, each of the positive electrode 3 and the negative electrode 4 includes an electrode sheet 35. The electrode sheet 35 includes a sheet-shaped electrode plate 31 and an electrode active material layer 32 formed on the electrode plate 31.

Specifically, in an electrode sheet 35P of the positive electrode 3, a mixture paste including a lithium transition metal oxide, serving as a positive electrode active material, is applied to an electrode plate 31P of the positive electrode 3 formed from aluminum and the like. In an electrode sheet 35N of the negative electrode 4, a mixture paste including a carbon-based material, serving as a negative electrode active material, is applied to an electrode plate 31N of the negative electrode 4 formed from copper and the like. Each mixture paste includes a binder. The mixture pastes are dried so that a positive electrode active material layer 32P and a negative electrode active material layer 32N are respectively formed on the positive and negative electrode sheets 35P and 35N.

The positive and negative electrode sheets 35P and 35N are shaped as strips. In the electrode body 10, the positive and negative electrode sheets 35P and 35N are stacked with the separator 5 held in between and rolled about a rolling axis L that extends in a widthwise direction of the strips (sideward direction in FIG. 2).

In FIG. 2, the separator 5 and the electrode sheets 35 are rolled with the electrode sheet 35P of the positive electrode 3 arranged at the inner side. However, this is an example of the structure of the electrode body 10. The separator 5 and the electrode sheets 35 may be rolled with the electrode sheet 35N of the negative electrode 4 arranged at the inner side. Such arrangement determines whether the outermost electrode sheet 35 of the electrode body will be the electrode sheet 35P of the positive electrode 3 or the electrode sheet 35N of the negative electrode 4.

External Terminal and Connecting Member

Figure 3:
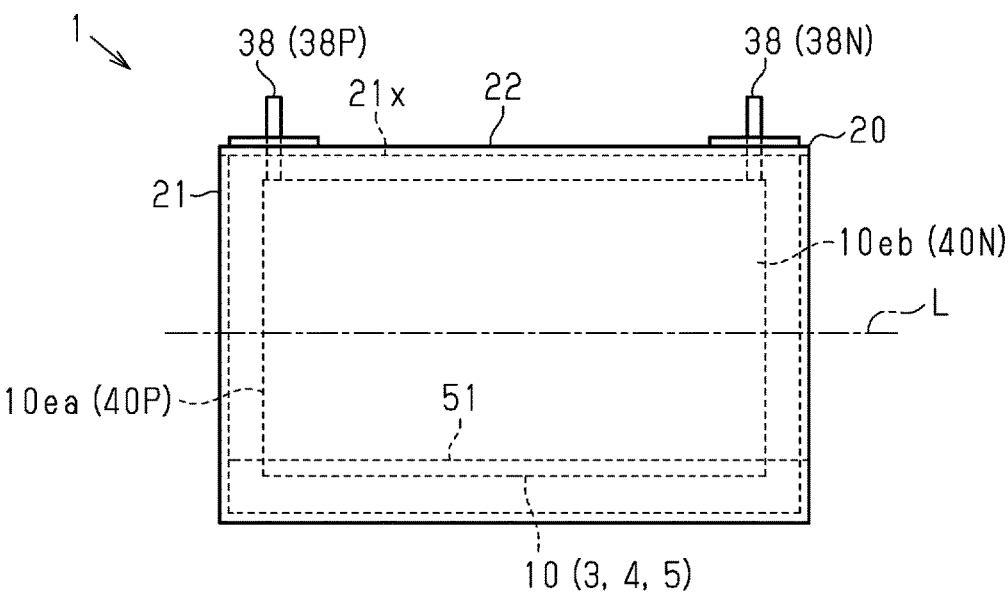
FIG. 3 is a side view of the rechargeable battery.

As shown in FIGS. 1 to 3, the lid 22 of the case 20 includes a positive electrode terminal 38P and a negative electrode terminal 38N projecting out of the case 20 as external terminals 38 of the rechargeable battery 1. Further, each electrode sheet 35 includes an uncoated portion 39 where the electrode active material layer 32 is not formed on the electrode plate 31. Specifically, ends of the electrode plates 31P and 31N in the widthwise direction, namely, an electrode plate end 40P of the positive electrode 3 and an electrode plate end 40N of the negative electrode 4, define the uncoated portions 39 of the electrode sheets 35. The mixture pastes including electrode active materials are applied to the strips of the electrode plates 31P and 31N. The uncoated portions 39 electrically connect the electrode sheet 35P of the positive electrode 3 to the positive electrode terminal 38P and the electrode sheet 35N of the negative electrode 4 to the negative electrode terminal 38N.

As shown in FIG. 2, in a state in which the electrode sheets 35 and the separator 5 are rolled, the electrode plate end 40P of the positive electrode 3 including the uncoated portion 39 is arranged at one axial end 10ea of the electrode body 10 (left end in FIG. 2). Further, the electrode plate end 40N of the negative electrode 4 including the uncoated portion 39 is arranged at the other axial end 10eb of the electrode body 10 (right end in FIG. 2). Thus, the electrode plate end 40P of the electrode sheet 35P and the electrode plate end of the electrode sheet 35N extend out of the rolled electrode body 10 away from each other in the rolling axis direction.

As shown in FIGS. 1 and 3, the electrode body 10 is accommodated in the case 20 in a state in which the rolling axis L of the electrode body 10 is parallel to a longitudinal direction of the lid 22 (sideward direction in FIG. 3). The lid 22 has the form of a substantially elongated rectangular plate. In this state, a connecting member 50P connects the electrode plate end 40P of the positive electrode 3 to the positive electrode terminal 38P, and a connecting member 50N connects the electrode plate end 40N of the negative electrode 4 to the negative electrode terminal 38N.

A fluorine-based electrolyte 51 is injected into the case 20 in a state in which the electrode body 10 is accommodated in the case 20 as described above. A lithium salt serving as a supporting electrolyte is dissolved in an organic solvent to adjust the electrolyte 51. This impregnates the electrode body 10 accommodated in the case 20 with the electrolyte 51.

Current Collector

A current collector joined to the electrode body 10 to form a connecting member between the electrode body 10 and an external terminal in the rechargeable battery 1 of the present embodiment will now be described.

Figure 4:
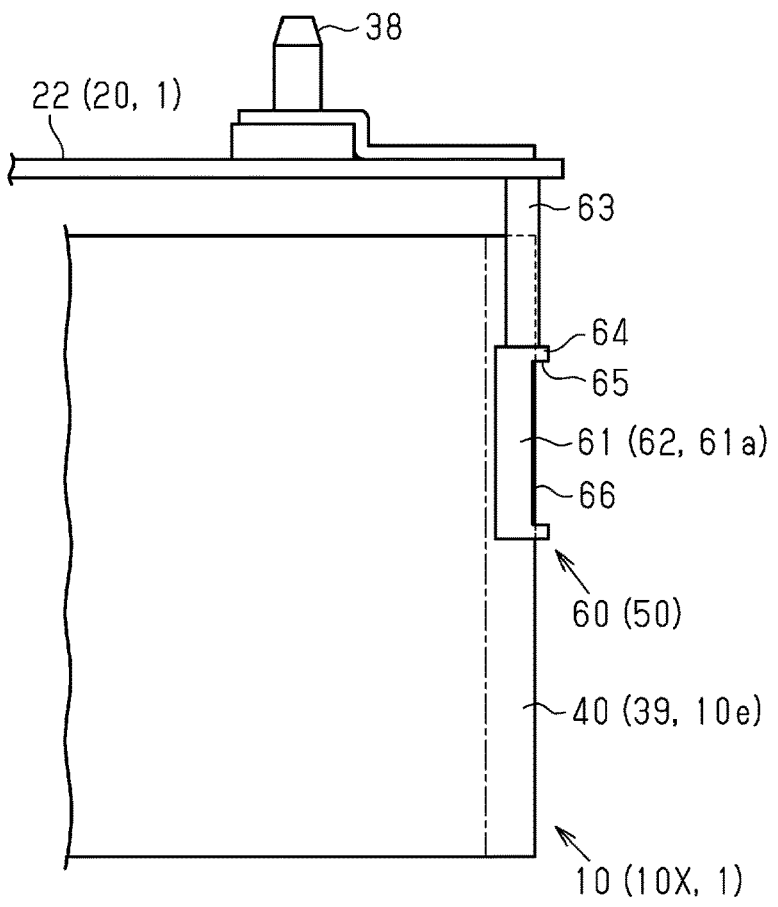
FIG. 4 is a side view of the electrode body and a current collector.
Figure 5:
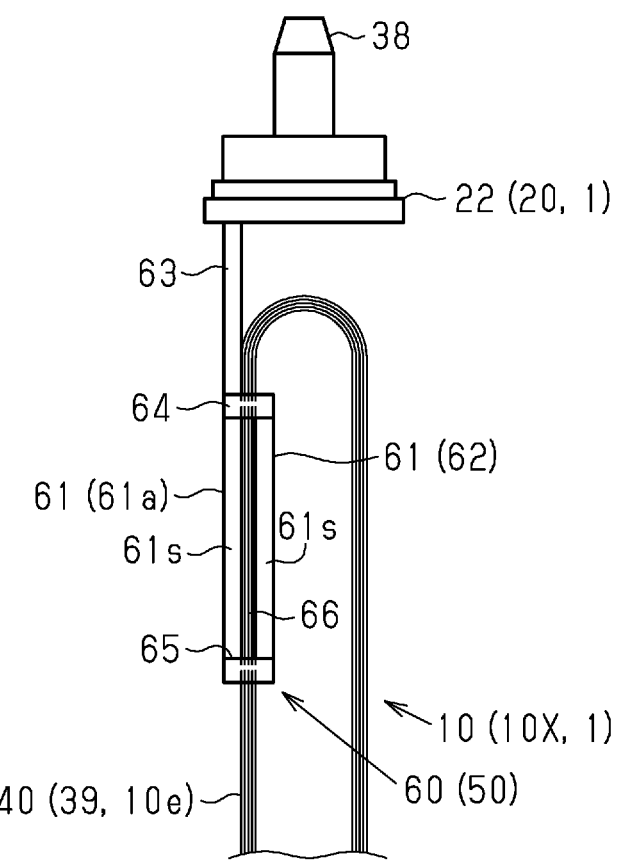
FIG. 5 is a side view of the electrode body and the current collector.

As shown in FIGS. 4 and 5, the electrode body 10 of the present embodiment has the structure of the rolled body 10X. Thus, the positive electrode 3 includes electrode plate end portions 40 overlapping one another in the thickness-wise direction at one axial end 10e of the electrode body 10, and the negative electrode 4 includes electrode plate end portions 40 overlapping one another in the thickness-wise direction at the other axial end 10e of the electrode body 10. In other words, in the electrode body 10 that is the rolled body 10X, the positive electrode 3 include a plurality of electrode plate end portions 40 overlapping one another in the thickness-wise direction at one axial end 10e of the electrode body 10, and the negative electrode 4 includes a plurality of electrode plate end portions 40 overlapping one another in the thickness-wise direction at the other axial end 10e of the electrode body 10. Further, the rechargeable battery 1 includes current collectors 60 joined to the axial ends 10e of the electrode body 10. As described above, the positive and negative electrode plate end portions 40 arranged at the axial ends 10e of the electrode body 10 define the uncoated portions 39 where the electrode active material layers 32 are not formed on the electrode plates 31 (refer to FIG. 2). Accordingly, the rechargeable battery 1 uses the current collectors as the positive and negative connecting members 50 that electrically connect the positive electrode 3 and the negative electrode 4 of the electrode body 10 to the positive and negative external terminals 38. Specifically, the positive electrode current collector 60 is used as the positive connecting member 50 that electrically connects the positive electrode 3 and the positive electrode external terminal 38, and the negative electrode current collector 60 is used as the negative connecting member 50 that electrically connect the negative electrode 4 and the negative electrode external terminal 38.

As shown in FIGS. 6 to 9, each current collector 60 includes a folded portion 62 and an extension portion 63. The folded portion 62 includes two opposing holding walls 61. The extension portion 63 is continuous with the folded portion 62.

The current collector 60 is attached to the axial end 10e of the electrode body 10 in a state in which the electrode plate end portions 40 overlapping one another in the thickness-wise direction are held between the two holding walls 61. In this state, the folded portion 62 of the current collector 60 is joined to the axial end 10e of the electrode body 10.

Further, the extension portion 63 connects the current collector 60 to the external terminal 38 (refer to FIGS. 4 and 5). In this manner, the rechargeable battery 1 includes the current collectors 60 acting as the positive and negative connecting members 50 in accordance with the polarities of the electrode plate end portions 40 to which the folded portions 62 are connected.

Each current collector 60 is formed by bending a metal plate (not shown). Further, the folded portion 62 of the current collector 60 includes a top portion 64 that has a substantially U-shaped cross section and connects the two holding walls 61. The folded portion 62 has a substantially rectangular side shape of which the longitudinal direction is parallel to a direction in which an edge 66 of the electrode plate end portions 40 held between the two holding walls 61 extends (sideward direction in FIG. 6). The extension portion 63 extends from one holding wall 61a in the longitudinal direction of the folded portion 62.

Further, the current collector 60 includes an opening 65 in the top portion 64 of the folded portion 62. The opening 65 is formed in a central part of the folded portion 62 in the longitudinal direction of the folded portion 62. The opening 65 extends in the longitudinal direction of the folded portion 62. The electrode plate end portions 40 held between the holding walls 61 are welded through the opening 65 so that the current collector 60 is joined to the axial end 10e of the electrode body 10 where the electrode plate end portions 40 are arranged.

Figure 6:
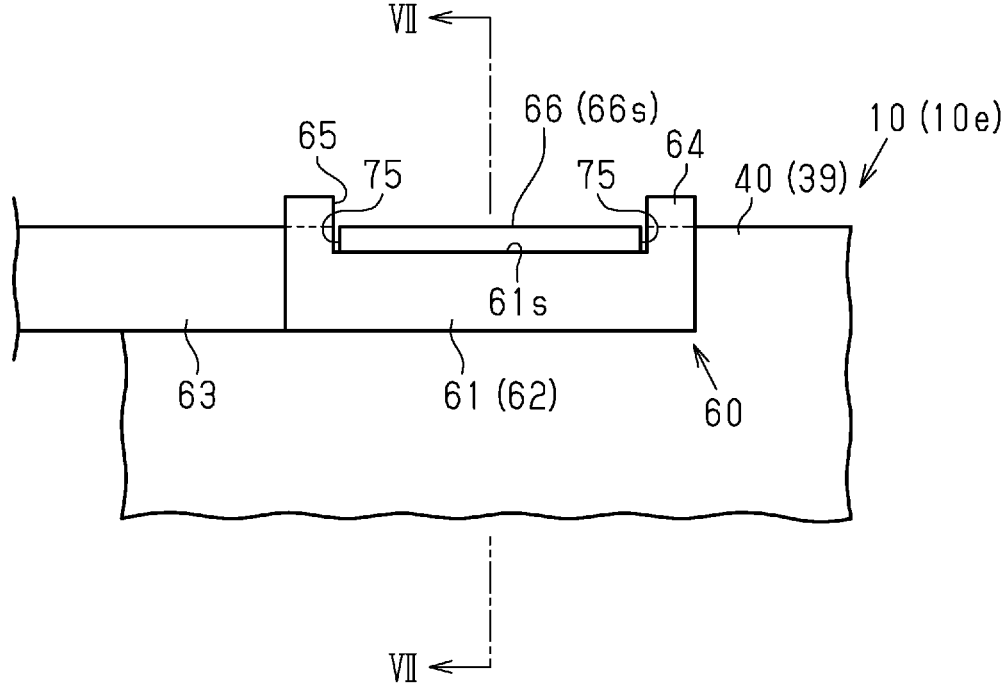
FIG. 6 is a side view showing a folded portion of the current collector and electrode plate end portions.
Figures 7, 8:
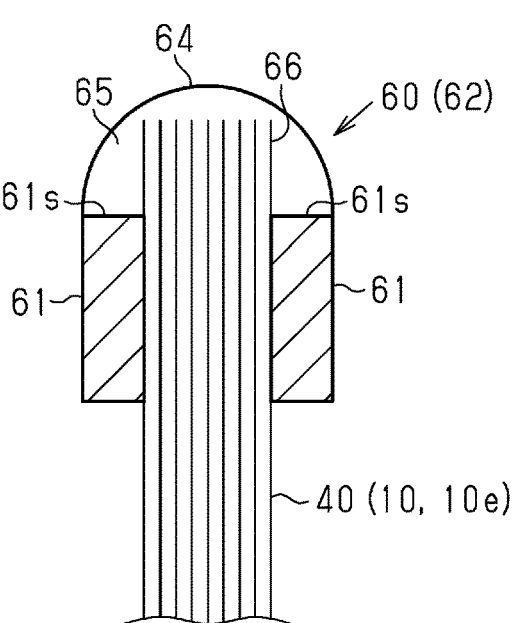
FIG. 7 is a cross-sectional view showing the folded portion of the current collector and the electrode plate end portions.
FIG. 8 is a diagram illustrating how the current collector is attached to electrode plate end portions.
Figure 9:
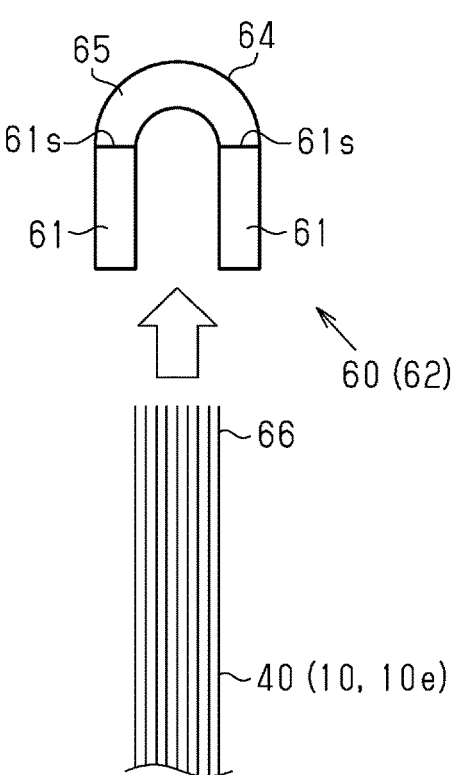
FIG. 9 is a diagram illustrating how the current collector is attached to the electrode plate end portions.

FIGS. 8 and 9 show the current collector 60 before being attached to the axial end 10e of the electrode body 10. FIGS. 6 and 7 show the current collector 60 before being welded to the electrode plate end portions 40 held between the two holding walls 61 of the folded portion 62. From the state shown in FIGS. 6 and 7, the current collector 60 is joined to the axial end 10e of the electrode body 10 by the following welding method.

Method for Welding Current Collector

Figure 10:
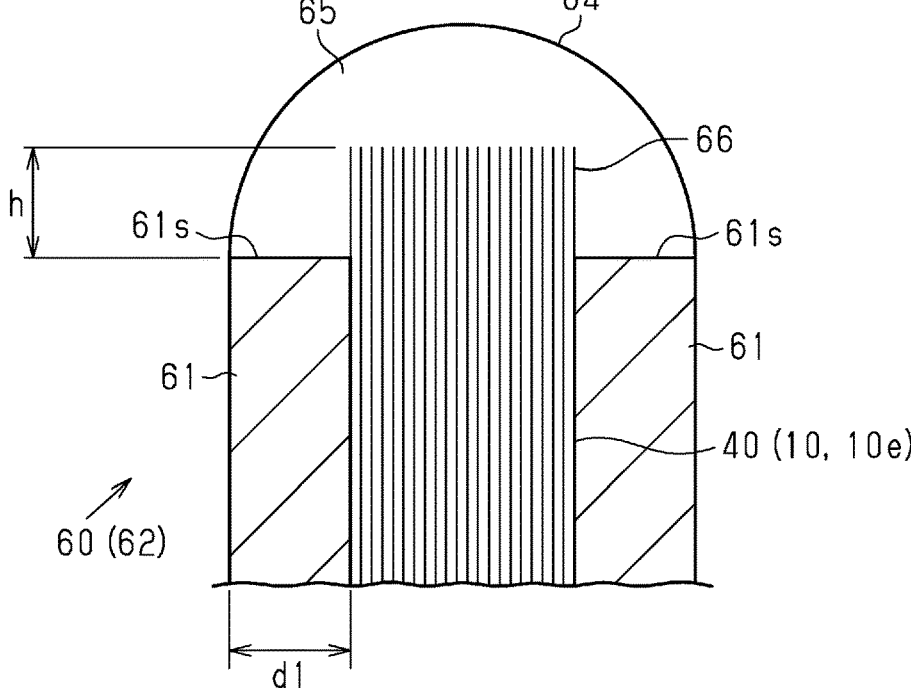
FIG. 10 is a cross-sectional view showing an edge of the electrode plate end portions projecting into an opening in the folded portion.
Figure 11:
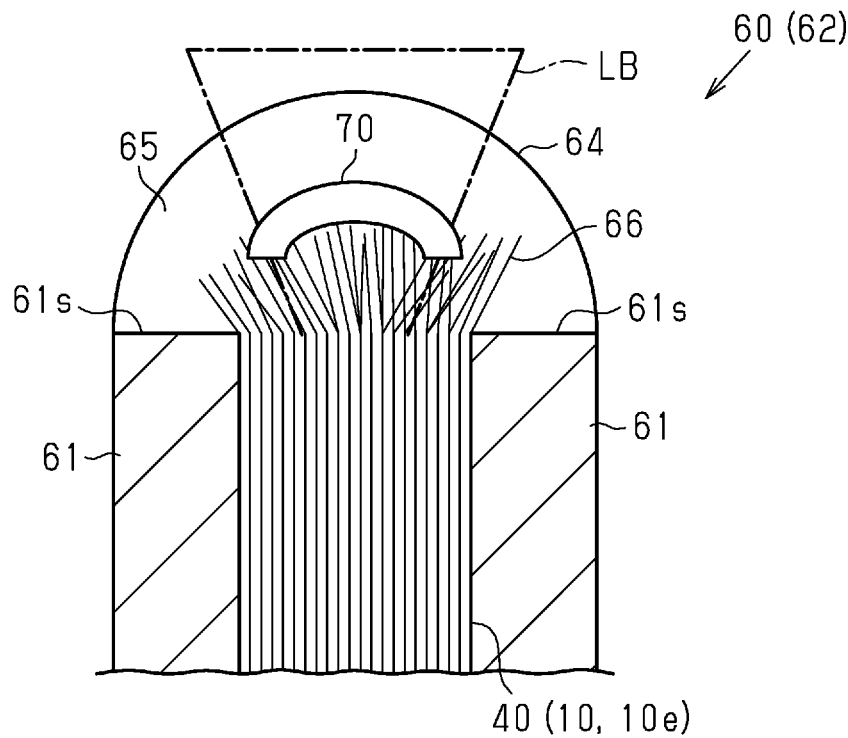
FIG. 11 is a diagram illustrating laser welding.
Figure 12:
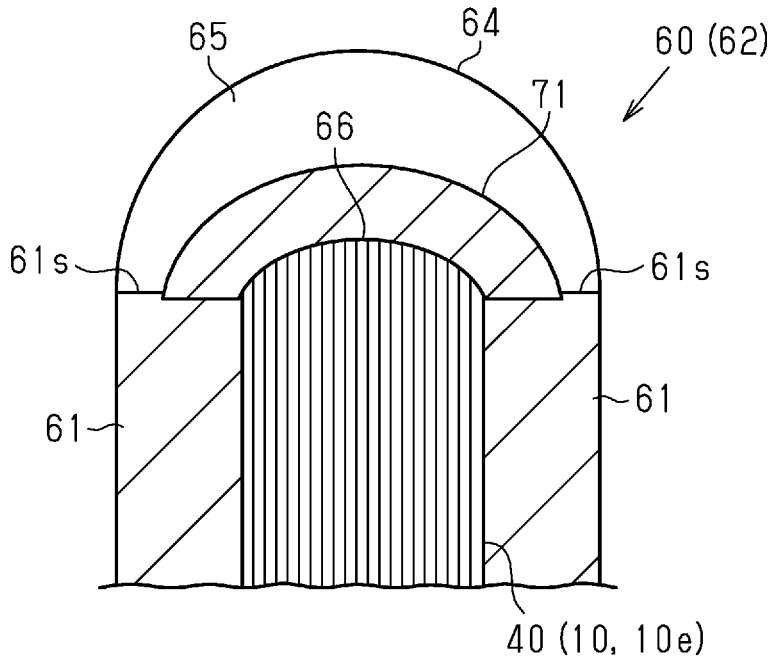
FIG. 12 is a diagram illustrating a welded portion formed by the laser welding.

As shown in FIGS. 10 to 12, the current collector 60 is attached to the axial end 10e of the electrode body 10 in a state in which the edge 66 of the electrode plate end portions 40 held between the two holding walls 61 of the folded portion 62 projects into the opening 65. In other words, the electrode plate end portions 40 held between the two holding walls 61 of the folded portion 62 are arranged such that the edge 66 projects into end surfaces 61s of the two holding walls 61 that define the opening 65. Further, in this state, the edge 66 of the electrode plate end portions 40 is irradiated with a laser beam LB through the opening 65 in the top portion 64 of the folded portion 62. This melts the edge 66 of the electrode plate end portions 40 and joins the edge 66 to the end surfaces 61s of the two holding walls 61 that define the opening 65. In other words, the folded portion 62 of the current collector 60 is laser-welded to the electrode plate end portions 40 at the axial end 10e of the electrode body 10.

Specifically, as shown in FIG. 11, when the edge 66 of the electrode plate end portions 40 projecting into the opening 65 is irradiated with the laser beam LB, the edge 66 of the electrode plate end portions 40 spreads as a result of thermal expansion as it melts. This forms a melted portion 70 with the electrode plate end portions 40 at the distal end of the spread edge 66. Accordingly, the opening 65 is used as an irradiation window for the laser beam LB.

Figure 13:
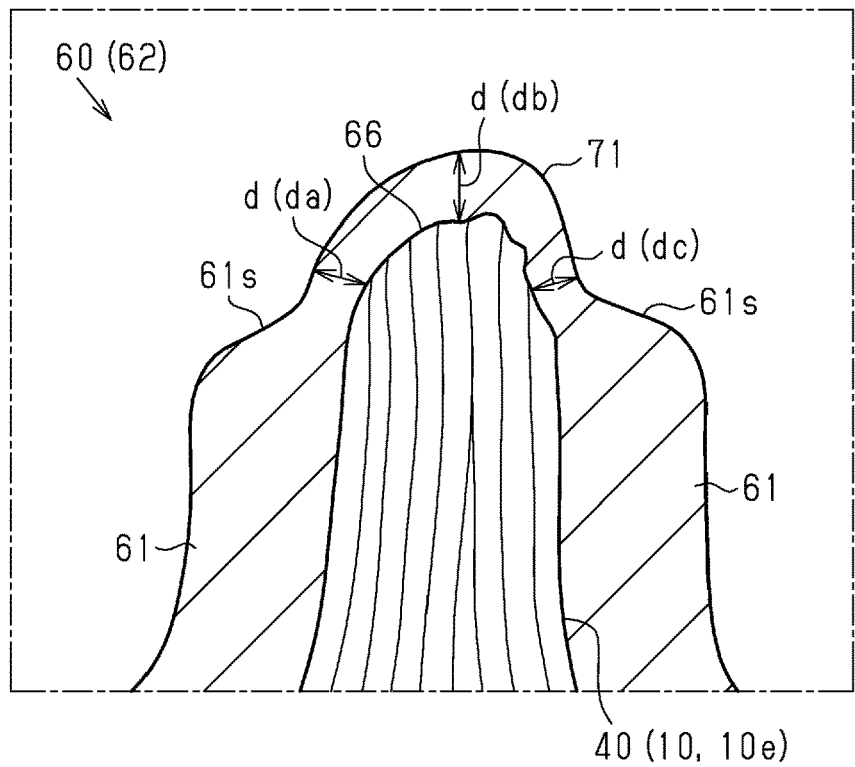
FIG. 13 is a cross-sectional view of the welded portion formed by the laser welding.

Further, as shown in FIGS. 11 to 13, the melted portion 70 irradiated with the laser beam LB grows in the thickness-wise direction of the overlapping electrode plate end portions 40, or an opposing direction of the two holding walls 61 holding the electrode plate end portions 40 (sideward direction in FIGS. 11 to 13). Specifically, in this case, the laser beam LB spreads out the edge 66 of the electrode plate end portions 40 into the shape of a sector. This forms a welded portion 71 in a state in which the welded portion 71 covers the edge 66 of the electrode plate end portions 40 projecting into the opening 65. The welded portion 71 has an arch-shaped cross section and connects the end surfaces 61s of the two holding walls 61 that define the opening 65.

The current collector 60 is formed from the same material as the electrode plate end portions 40 at the axial end 10e of the electrode body 10 and joined with the current collector 60. Specifically, the current collector 60 joined to the electrode plate end 40P of the positive electrode 3 is formed from aluminum and the like in the same manner as the electrode plate 31P of the positive electrode 3. Further, the current collector 60 joined to the electrode plate end 40N of the negative electrode 4 is formed from copper and the like in the same manner as the electrode plate 31N of the negative electrode 4. Thus, the welded portion 71 formed by laser welding is substantially seamlessly connected to the end surfaces 61s of the two holding walls 61.

Also, the edge 66 of the electrode plate end portions 40 projecting into the opening 65 spreads during laser welding so that the molten component of the electrode plate end portions 40 enters the gaps between the electrode plate end portions 40 overlapping one another in the thickness-wise direction. As a result, the welded portion 71 has a substantially uniform thickness d over the entire region of the arch-shaped cross section (da db dc). This allows the rechargeable battery 1 of the present embodiment to ensure an appropriate joined state of the current collector 60 and the axial end 10e of the electrode body 10.

As shown in FIGS. 6 and 8, slits 75 are formed in the edge 66 of the electrode plate end portions 40 held between the two holding walls 61 of the folded portion 62. Specifically, the slits 75 are formed where the edge 66 of the electrode plate end portions 40 projects into the opening 65, more specifically, at two ends of the opening 65 that extends in the longitudinal direction of the folded portion 62. Thus, the slits 75 open in a projection end 66s of the edge 66 and extend in a direction in which the edge 66 of the electrode plate end portions 40 projects into the opening 65 (upward in FIGS. 6 and 8).

Such slits 75 allow the edge 66 of the electrode plate end portions 40 projecting into the opening 65 to spread easily during laser welding. As a result, the laser beam LB readily melts the edge 66 of the electrode plate end portions 40. In this manner, the rechargeable battery 1 of the present embodiment restricts thermal denaturation during laser welding while ensuring an appropriate joined state of the current collector 60 effectively.

The welded portion 71 connects the edge 66 of the electrode plate end portions 40, held between the two holding walls 61, to the end surfaces 61s, of the two holding walls 61 in a state in which the welded portion 71 projects into the opening 65 from the end surfaces 61s of the two holding walls 61. Thus, the rechargeable battery 1 of the present embodiment is structured to limit the heat transferred to the interior of the electrode body 10 from the electrode plate end portions 40 during laser welding.

Figure 14:
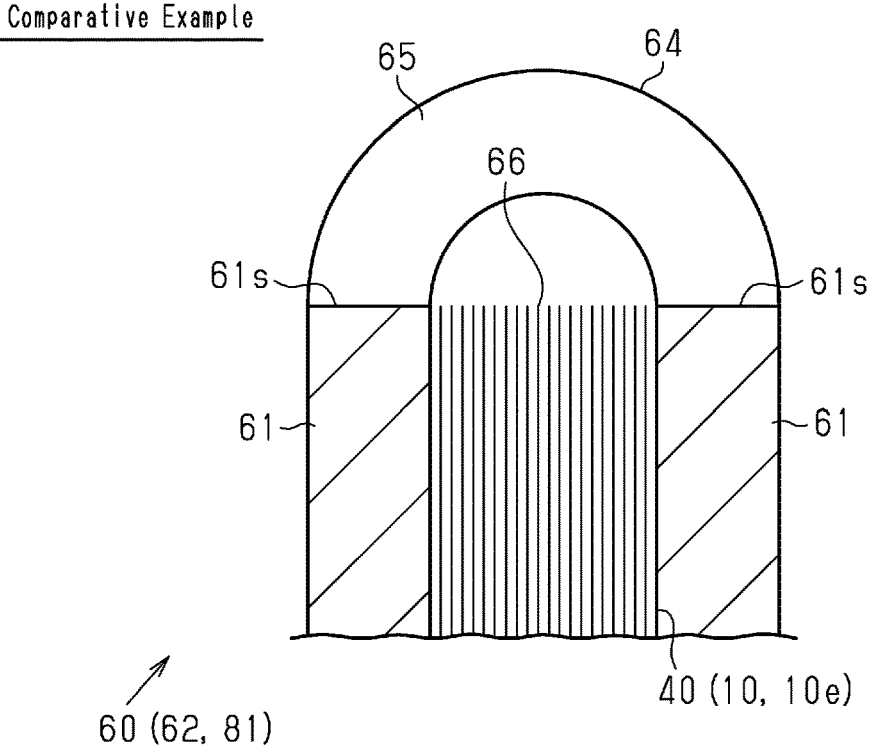
FIG. 14 is a diagram illustrating the positional relationship between the electrode plate end portions and two holding walls of the folded portion before laser welding in a comparative example.
Figure 15:
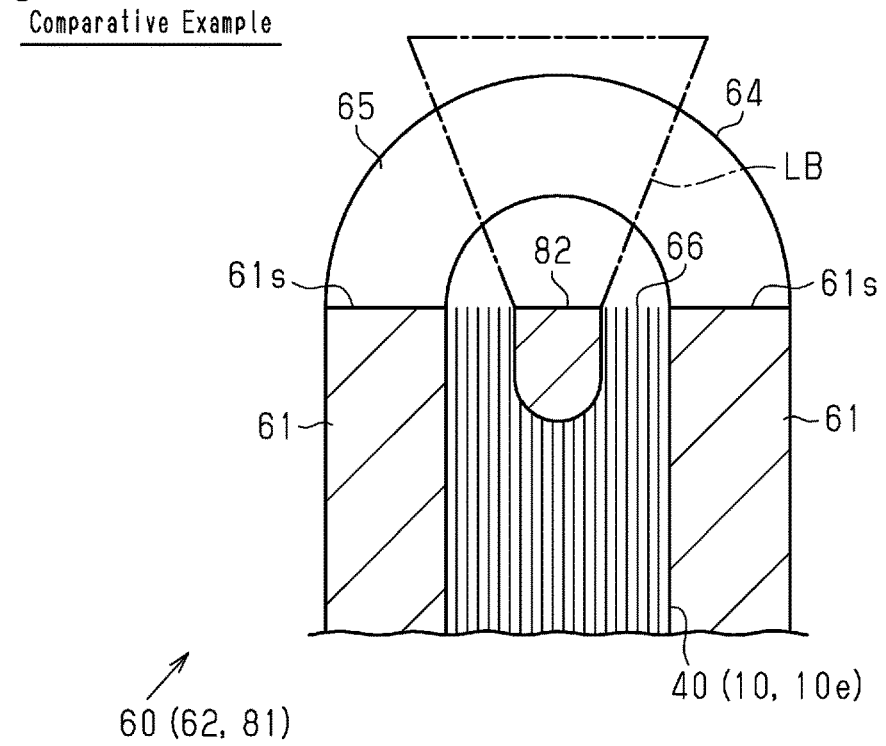
FIG. 15 is a diagram illustrating laser welding in the comparative example.
Figure 16:
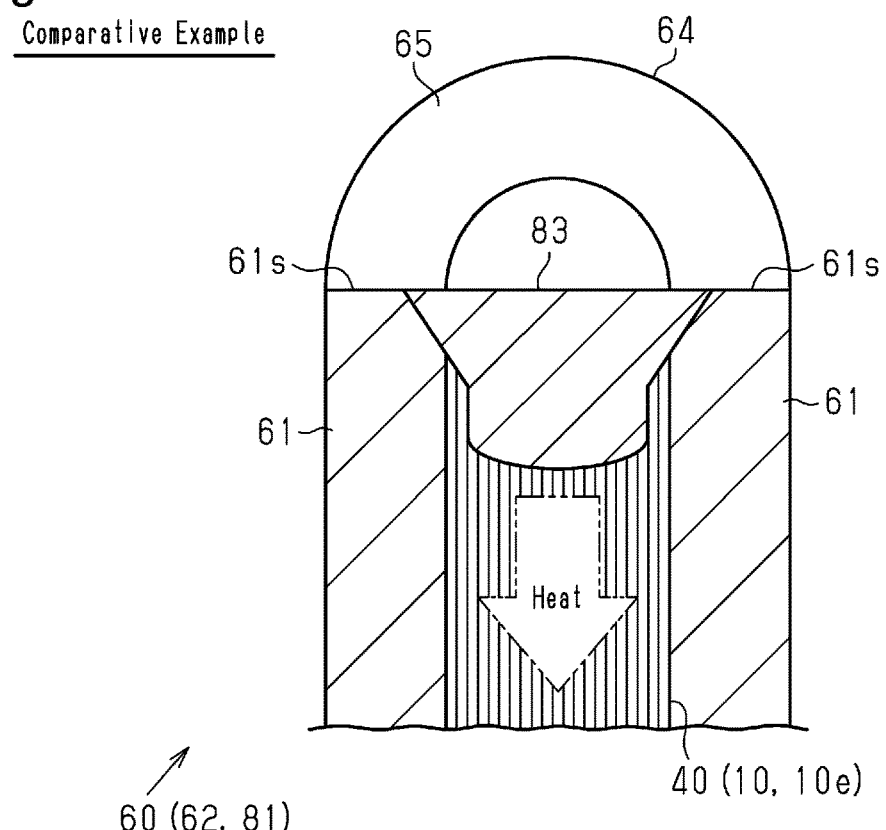
FIG. 16 is a diagram illustrating a welded portion formed by the laser welding in the comparative example.

In a rechargeable battery 81 of a comparative example shown in FIGS. 14 to 16, for example, laser welding is performed in a state in which the electrode plate end portions 40 held between the two holding walls 61 of the folded portion 62 are not projecting into the opening 65.

In the rechargeable battery 81, the laser beam LB irradiates the edge 66 of the electrode plate end portions 40 held between the two holding walls 61 of the folded portion 62. This forms a melted portion 82 of the electrode plate end portions 40 at the inner side of the end surfaces 61s of the two holding walls 61.

Further, the melted portion 82 grows in the opposing direction of the two holding walls 61 (sideward direction in FIGS. 14 to 16) and also deeper (lower in FIGS. 14 to 16) from the end surfaces 61s of the two holding walls 61. This forms a welded portion 83 that connects the two holding walls 61 in the rechargeable battery 81.

In the rechargeable battery 81 of the comparative example, when welding the current collector 60 to the axial end 10e of the electrode body 10, the electrode plate end portions 40 melt near the interior of the electrode body 10. Thus, the heat of the electrode plate end portions 40 is likely to be transferred to the interior of the electrode body 10. Also, fine scattered pieces referred to as "spatters" may be generated during the welding.

As shown in FIGS. 11 and 12, in the rechargeable battery 1 of the present embodiment, the laser beam LB melts the edge 66 of the electrode plate end portions 40 projecting into the opening 65 from the end surfaces 61s of the two holding walls 61. Thus, the welded portion 71 will not be formed on a portion where the electrode plate end portions are held between the two holding walls 61. Accordingly, the heat of the edge 66 of the electrode plate end portions 40 is less likely to be transferred to the interior of the electrode body 10 during the welding. In this manner, the rechargeable battery 1 of the present embodiment restricts thermal denaturation during laser welding. For example, the rechargeable battery 1 of the present embodiment avoids a situation in which the heat of the electrode plate end portions 40 generated by the laser beam LB deteriorates the electrode active material or a situation in which the thermally expanded electrode plate end portions 40 contract and break the electrode plate 31.

Figure 17:
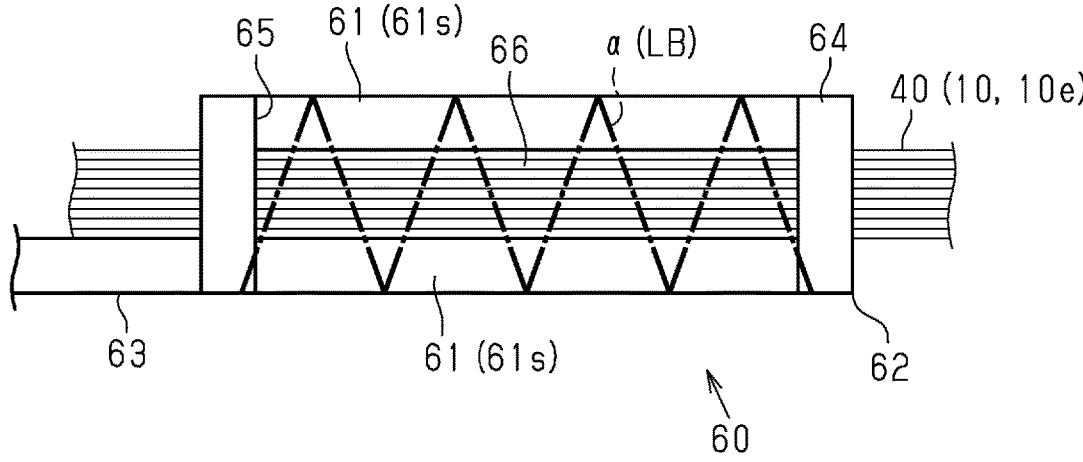
FIG. 17 is a top view of a scanning pattern during laser welding.
Figure 18:
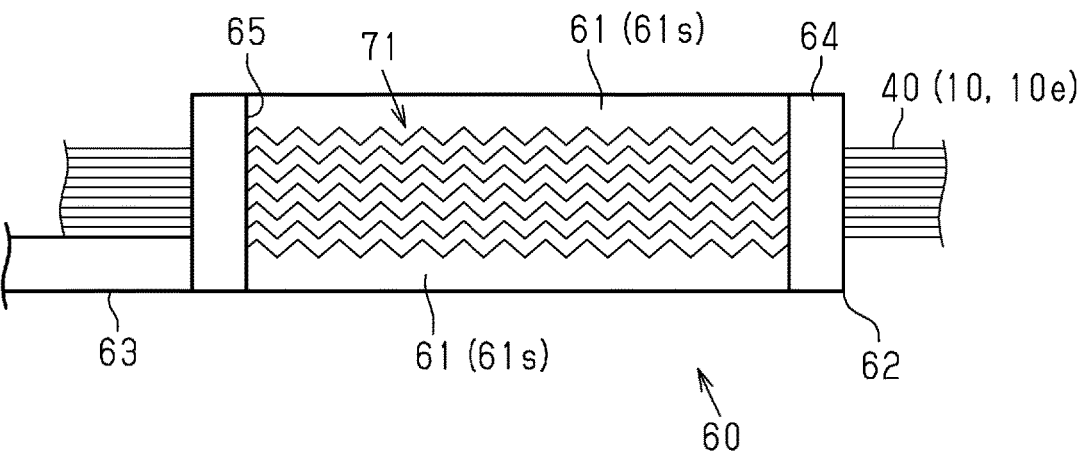
FIG. 18 is a diagram illustrating the welded portion formed by the laser welding.

As shown in FIGS. 17 and 18, the edge 66 of the electrode plate end portions 40 is irradiated with the laser beam LB in accordance with a scanning pattern a by moving the laser beam LB in the thickness-wise direction relative to the electrode plate end portions 40. Specifically, in the present embodiment, the laser beam LB irradiating the electrode plate end portions 40 is moved in the zigzagged scanning pattern a between the end surfaces 61s of the two holding walls 61 holding the electrode plate end portions 40. In other words, the laser beam LB irradiating the electrode plate end portions 40 is moved in the direction in which the edge 66 of the electrode plate end portions 40 extends (sideward direction in FIG. 17) and in the thickness-wise direction of the electrode plate end portions 40 (top-bottom direction in FIG. 17). This efficiently heats the edge 66 of the electrode plate end portions 40 projecting into the opening 65 and the end surfaces 61s of the two holding walls 61. Accordingly, the welded portion 71 has a preferred shape.

As shown in FIG. 10, it is preferred that a projection amount h of the electrode plate end portions 40 projecting into the opening 65 be set to a value less than a thickness d1 of each of the two holding walls 61 holding the electrode plate end portions 40 (d1>h). Preferably, the projection amount h of the electrode plate end portions 40 is set to a value 100 times greater than a thickness d2 of each foil of the electrode plate end portions 40, or "foil thickness" (h>d2×100). The opening 65 has a depth greater than the preset projection amount h in a height direction of the folded portion 62. In an example, the opening 65 has a depth greater than the thickness d1 of each of the two holding walls 61, and a length in the longitudinal direction of the folded portion 62 that is greater than the depth of the opening 65. In an example, the top portion 64 of the folded portion 62 includes two bridges arranged at two ends of the folded portion 62 in the longitudinal direction to connect the two holding walls 61. In an example, in a side view of the folded portion 62, the end surfaces 61s of the folded portion 62 define the bottom of the opening 65.

Figure 19:
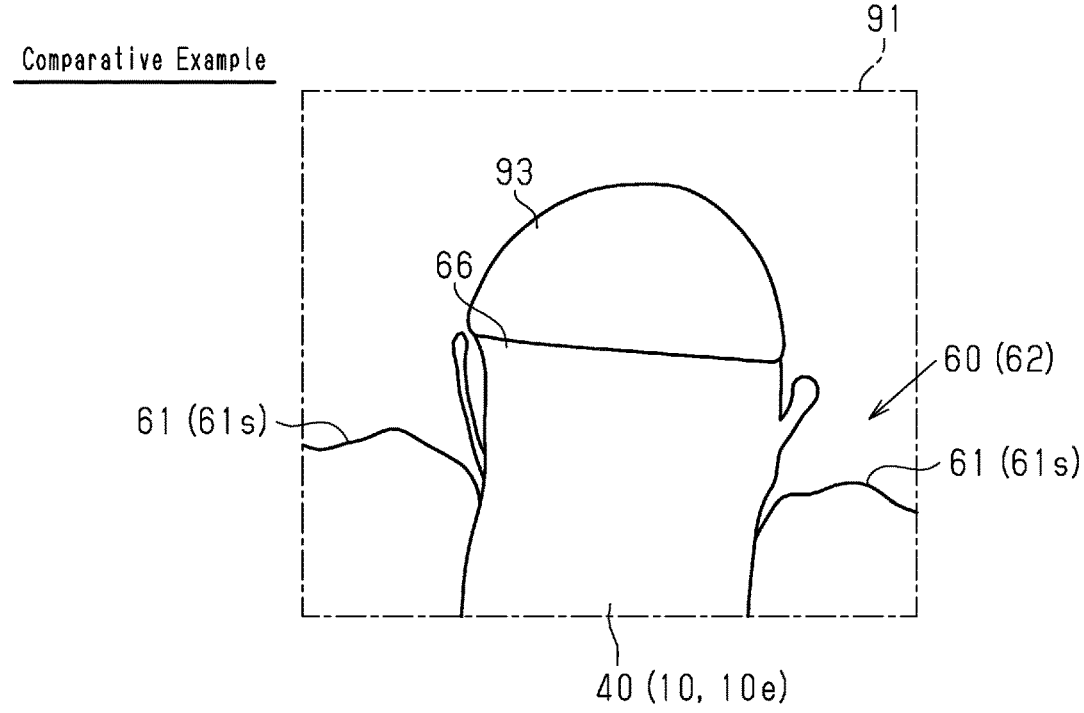
FIG. 19 is a cross-sectional view of a welded portion formed when a projection amount of the electrode plate end portions is too large.

As in a rechargeable battery 91 of a comparative example shown in FIG. 19, when the projection amount h of the electrode plate end portions 40 is too large, a welded portion 93 formed by the laser beam LB may not be connected to the end surfaces 61s of the two holding walls 61 holding the electrode plate end portions 40. This is because of the difficulty for correctly irradiating the edge 66, more specifically the distal end of the edge 66 of the electrode plate end portions 40 projecting into the opening 65, with the laser beam LB.

Further, when the projection amount h of the electrode plate end portions 40 is too small, the two holding walls 61 will rigidly support the electrode plate end portions 40 and limit spreading of the edge 66 of the electrode plate end portions 40 projecting into the opening 65 when irradiated with the laser beam LB. This is similar to when irradiating the edge 66 of the electrode plate end portions 40 held between the two holding walls 61 of the folded portion 62 with the laser beam LB in a state in which the edge 66 is not projecting into the opening 65 as in the rechargeable battery 81 of the comparative example. Therefore, it is preferable that the projection amount h of the electrode plate end portions 40 projecting into the opening 65 be set within an appropriate range as described above.

Operation

The operation of the present embodiment will now be described.

The edge 66 of the electrode plate end portions 40 projecting into the opening 65 is irradiated with the laser beam LB so that the edge 66 of the electrode plate end portions 40 spreads as a result of thermal expansion as it melts. This forms the welded portion 71 that connects the edge 66 of the electrode plate end portions 40, held between the two holding walls 61 to the end surfaces 61s of the two holding walls 61, in a state in which the edge 66 of the electrode plate end portions 40 projects into the opening 65 from the end surfaces 61s of the two holding walls 61.

Advantages

The present embodiment has the following advantages.

(1) With the structure of the present embodiment, the laser beam LB melts the edge 66 of the electrode plate end portions 40 that projects into the opening 65 from the end surfaces 61s of the two holding walls 61, which hold the electrode plate end portions 40. Thus, the welded portion 71 will not be formed on a portion where the electrode plate end portions 40 are held between the two holding walls 61. Accordingly, the heat of the edge 66 of the electrode plate end portions 40 is less likely to be transferred to the interior of the electrode body 10 during the welding. This avoids thermal denaturation, such as a situation in which the heat of the electrode plate end portions 40 generated by the laser beam LB deteriorates the electrode active material or a situation in which the thermally expanded electrode plate end portions 40 contract and break the electrode plate 31.

Further, the edge 66 of the electrode plate end portions 40 projecting into the opening 65 is thermally expanded during laser welding so that the edge 66 of the electrode plate end portions 40 spreads as it melts. Thus, the laser beam LB readily melts the edge 66 of the electrode plate end portions 40. This minimizes the total amount of heat applied to the electrode plate end portions 40 during laser welding. In this manner, the above structure restricts thermal denaturation effectively when joining the current collector 60 to the axial end 10e of the electrode body 10.

With the above structure, the laser beam LB spreads out the edge 66 of the electrode plate end portions 40, overlapping one another in the thickness-wise direction, into the shape of a sector during laser welding. This forms the welded portion 71 that has an arch-shaped cross section and connects the end surfaces 61s of the two holding walls 61 in a state in which the welded portion 71 covers the edge 66 of the electrode plate end portions 40 projecting into the opening 65.

In this case, the electrode plate end portions 40 spread so that the molten component of the electrode plate end portions 40 enters into the gaps between the electrode plate end portions 40 overlapping one another in the thickness-wise direction. As a result, the welded portion 71 has a substantially uniform thickness d over the entire region of the arch-shaped cross section. This ensures an appropriate joined state of the current collector 60 and the axial end 10e of the electrode body 10. Furthermore, generation of fine scattered pieces referred to as "spatters" is limited during welding.

(2) The electrode plate end portions 40 include the slits 75 at the positions where the edge 66 projects into the opening 65. The slits 75 extend in the direction in which the edge 66 of the electrode plate end portions 40 projects and open in the projection end 66s of the edge 66 of the electrode plate end portions 40.

With the above structure, the edge 66 of the electrode plate end portions 40 projecting into the opening 65 easily spreads during laser welding. Thus, the laser beam LB readily melts the edge 66 of the electrode plate end portions 40, thereby minimizing the total amount of heat applied to the electrode plate end portions 40 during laser welding. This restricts thermal denaturation during the laser welding while ensuring an appropriate joined state of the current collector 60 effectively.

(3) The edge 66 of the electrode plate end portions 40 is irradiated with the laser beam LB while moving the laser beam LB in the thickness-wise direction of the electrode plate end portions 40 relative to the electrode plate end portions 40.

With the above structure, the laser beam LB efficiently heats the edge 66 of the electrode plate end portions 40 projecting into the opening 65 and the end surfaces 61s of the two holding walls 61 holding the electrode plate end portions 40. Thus, the welded portion 71 ensures an appropriate joined state of the current collector 60.

Second Embodiment

A second embodiment related to a method for joining a current collector and a joining structure will now be described with reference to the drawings. To facilitate illustration, the same reference numerals are given to those components that are the same as the corresponding components of the first embodiment. Such components will not be described in detail.

Figure 20:
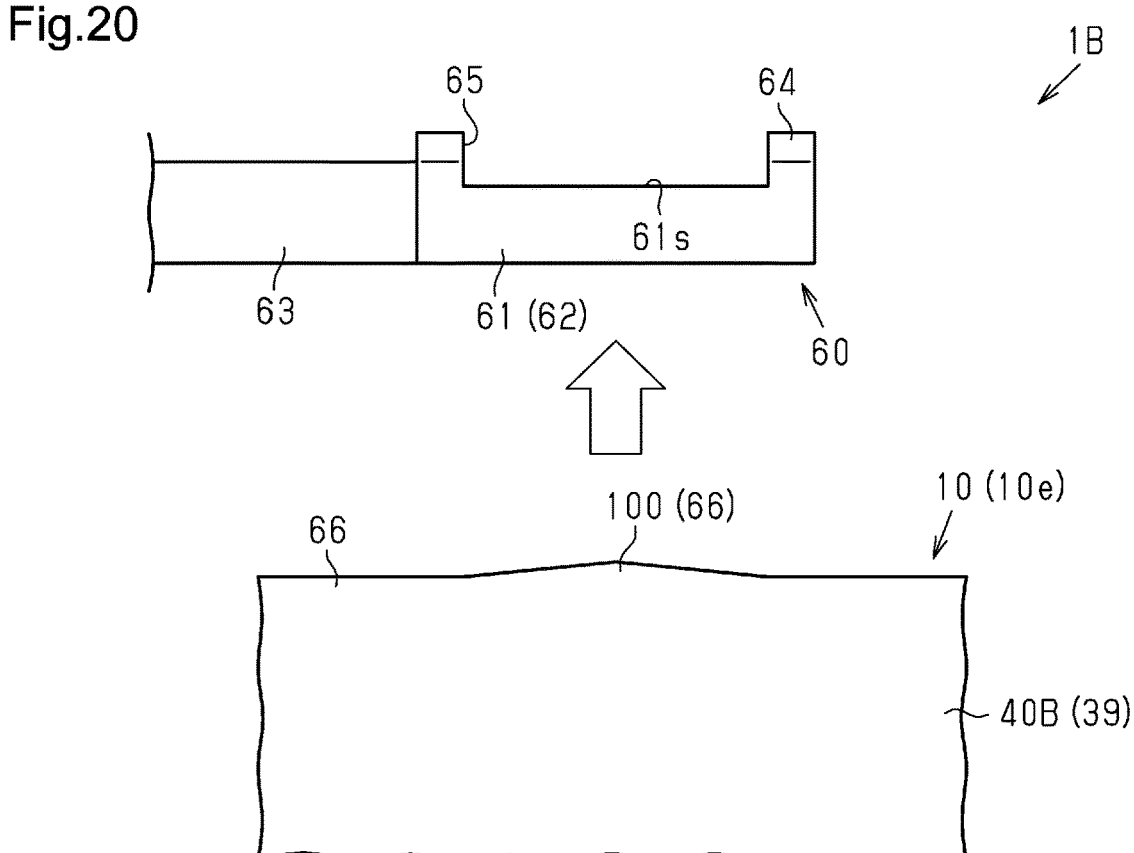
FIG. 20 is a diagram illustrating how a current collector is attached to electrode plate end portions in accordance with a second embodiment.
Figure 21:
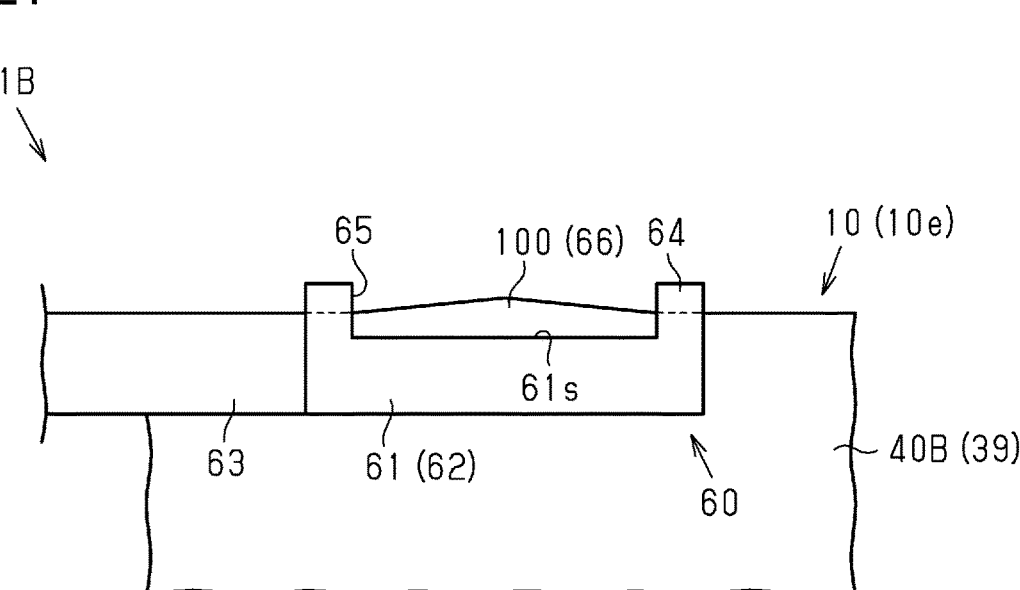
FIG. 21 is a side view showing a folded portion of the current collector and the electrode plate end portions in accordance with the second embodiment.

As shown in FIGS. 20 and 21, a rechargeable battery 1B of the present embodiment differs from that of the first embodiment in the structure that allows the edge 66 to spread easily during laser welding.

Specifically, in the rechargeable battery 1B of the present embodiment, the edge 66 of electrode plate end portions 40B, which are held between the two holding walls 61 of the folded portion 62 of the current collector 60, does not include the slits 75 of the first embodiment (refer to FIGS. 6 and 8). Instead of the slits 75, the electrode plate end portions 40B of the present embodiment include a ridge 100 that projects into the opening 65 in a state in which the electrode plate end portions 40B are held between the two holding walls 61 of the folded portion 62. The ridge 100 serves as the structure that allows the edge 66 to spread easily.

The ridge 100 has a substantially triangular side shape that projects into the opening 65 in a state in which the electrode plate end portions 40B are held between the two holding walls 61 of the folded portion 62. During laser welding, the ridge 100 is irradiated with the laser beam LB in a state in which the ridge 100 at the edge 66 of the electrode plate end portions 40 projects into the opening 65.

The ridge 100 is configured such that a projection amount h (refer to FIG. 10) of the ridge 100 increases toward the center of the opening 65 from an end of the opening 65 in the longitudinal direction of the opening 65 that extends along the edge 66 of the electrode plate end portions 40B (sideward direction in FIGS. 20 and 21). More specifically, the projection amount h of the ridge 100 at the two longitudinal ends of the opening 65 is substantially zero. Accordingly, even in a state in which the ridge 100 projects into the opening 65, the top portion 64 of the folded portion 62 including the opening 65 does not support the two longitudinal ends of the ridge 100. Thus, the ridge 100 is easily spread by the laser beam LB. This restricts thermal denaturation during laser welding effectively while ensuring an appropriate joined state of the current collector 60.

As described above, the present embodiment also has the same advantages as the first embodiment.

Figure 22:
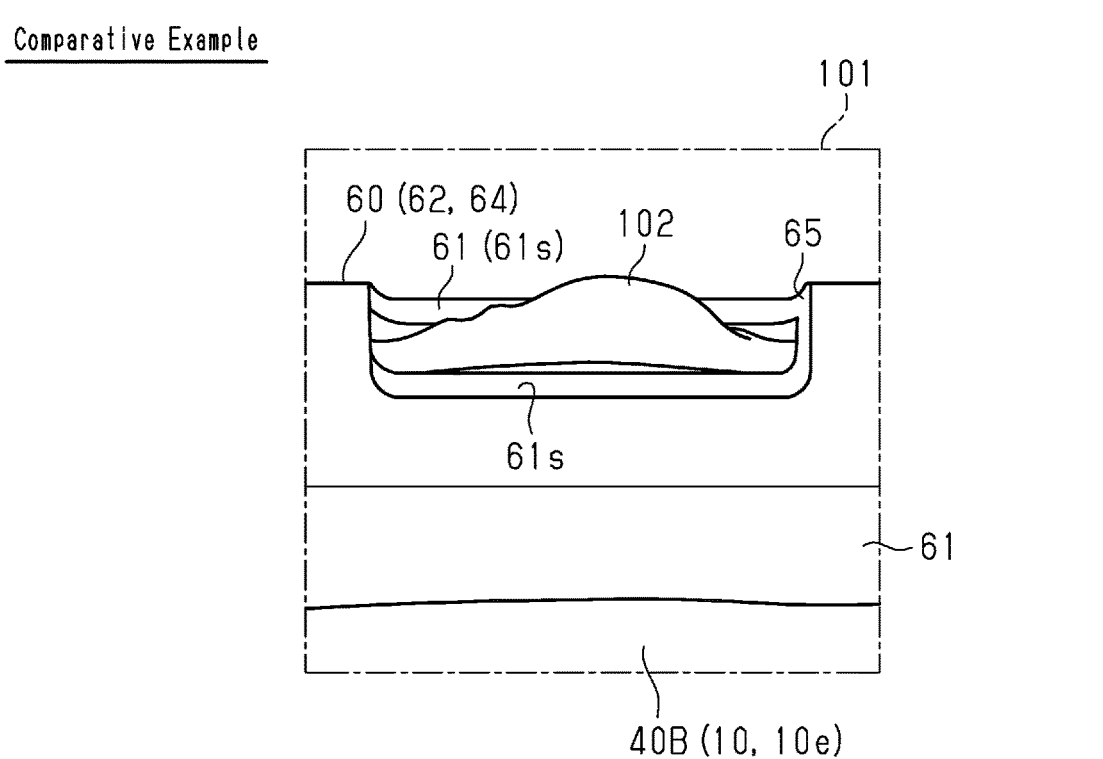
FIG. 22 is a perspective view of a welded portion formed when a projection amount of the electrode plate end portions is too large in the second embodiment.

A rechargeable battery 101 of a comparative example shown in FIG. 22 shows an example in which the projection amount h of the ridge 100 is too large. In such a case, a welded portion 102 formed by the laser beam LB may not be connected to the end surfaces 61s of the two holding walls 61 holding the electrode plate end portions 40B. Thus, when the ridge 100 is formed on the edge 66 of the electrode plate end portions 40B, it is also preferred that the projection amount h of the ridge 100 be set within an appropriate range as in the first embodiment.

Third Embodiment

A third embodiment related to a method for joining a current collector and a joining structure will now be described with reference to the drawings. To facilitate illustration, the same reference numerals are given to those components that are the same as the corresponding components of the above embodiments. Such components will not be described in detail.

Figure 23:
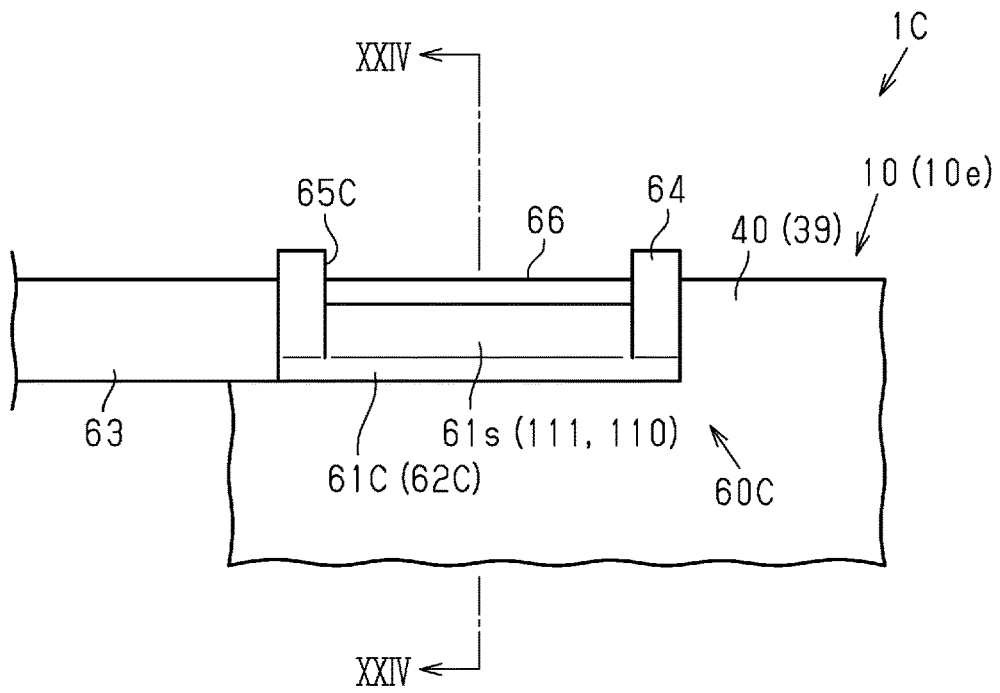
FIG. 23 is a side view showing a folded portion of a current collector and electrode plate end portions in accordance with a third embodiment.
Figure 24:
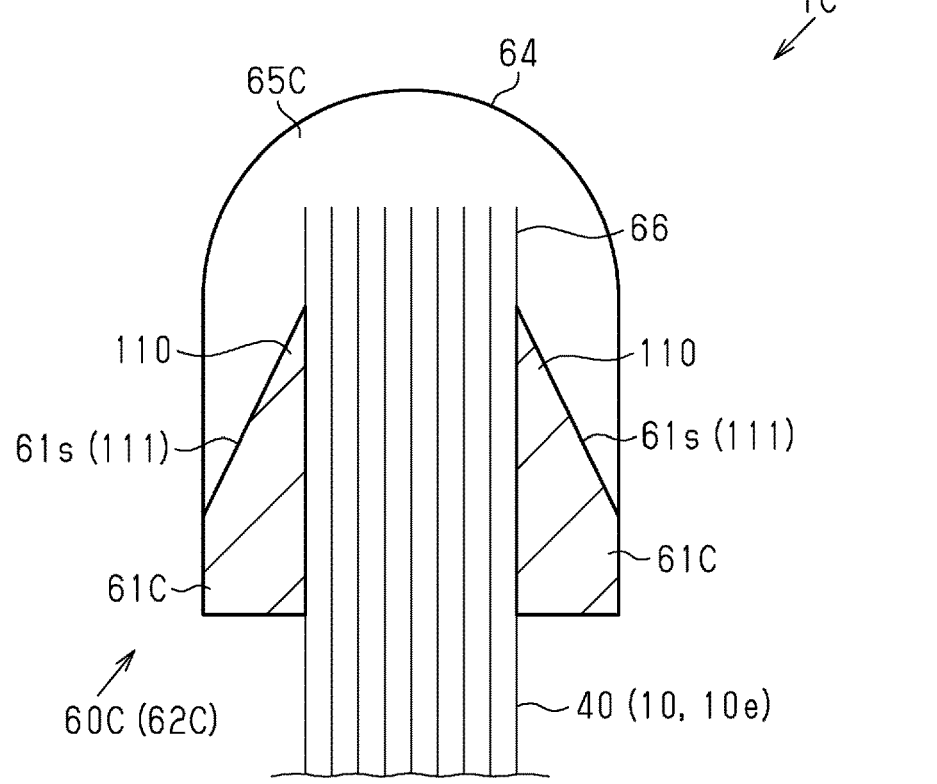
FIG. 24 is a cross-sectional view of thin portions in the two holding walls holding the electrode plate end portions.

As shown in FIGS. 23 and 24, a rechargeable battery 1C of the present embodiment differs from that of the first embodiment also in the structure that allows the edge 66 to spread easily during laser welding.

Specifically, in the rechargeable battery 1C of the present embodiment, a current collector 60C includes thin portions 110 on two holding walls 61C that hold the electrode plate end portions 40 in between in the thickness-wise direction of the electrode plate end portions 40. More specifically, at positions where the end surfaces 61s of the two holding walls 61C are arranged, inclined surfaces 111 are formed to define an opening 65C in the top portion 64 of a folded portion 62C of the current collector 60C. Thus, the thin portions 110 are respectively included at positions where the end surfaces 61s of the two holding walls 61C are formed.

During laser welding, the laser beam LB softens the electrode plate end portions 40 near the end surfaces 61s of the two holding walls 61C holding the electrode plate end portions 40 such that the edge 66 of the electrode plate end portions 40 projecting into the opening 65 spreads easily. Accordingly, the current collector 60C of the present embodiment is configured to reduce the thermal capacity of such portions with the thin portions 110 at positions where the end surfaces 61s of the two holding walls 61C are formed. Thus, in the rechargeable battery 1C of the present embodiment, the temperature of the electrode plate end portions 40 near the end surfaces 61s of the two holding walls 61C readily increases during laser welding. In other words, the laser beam LB readily softens the electrode plate end portions 40 near the end surfaces 61s and spreads the edge 66 of the electrode plate end portions 40 projecting into the opening 65.

The present embodiment also effectively restricts thermal denaturation during laser welding while ensuring an appropriate joined state of the current collector 60C in the same manner as the above embodiments. Further, the thickness d1 of each of the holding walls 61C determines how easily the laser beam LB increases the temperature, or the thermal capacity. Accordingly, the application of the structure of the present embodiment is preferable when the current collector 60 is joined to the electrode plate end portions 40 when each of the two holding walls 61C has a tendency to have a large thickness d1 of in order to ensure that the two holding walls 61C rigidly support the electrode plate end portions 40. For example, the present structure is further advantageous when applied to the current collector 60 joined to the electrode plate end 40P of the positive electrode 3 that is formed from aluminum or the like.

The above embodiments may be modified as follows. The above embodiments and the following modifications can be combined as long as the combined modifications remain technically consistent with each other.

In the first embodiment, the slits 75 are formed at the two ends of the opening 65 that extends in the longitudinal direction of the folded portion 62. However, the present disclosure is not limited to such a structure. The number and the arrangement of the slits 75 may be changed. The shape of the slit 75 may also be changed.

In the second embodiment, the ridge 100 has a substantially triangular side shape that projects into the opening 65. However, the present disclosure is not limited to such a structure. The shape of the ridge 100 may be changed.

Also, the slits 75 and the ridge 100 may be used together. The edge 66 of the electrode plate end portions 40 do not have to include any of the slits 75 and the ridge 100.

In the third embodiment, the inclined surfaces 111 are formed where the end surfaces 61s of the two holding walls 61C define the opening 65C. The inclined surfaces 111 form the thin portions 110. However, the present disclosure is not limited to that structure. The shape of the thin portions 110 may be changed. For example, steps may be arranged where the end surfaces 61s of the two holding walls 61C are located to form the thin portions.

The third embodiment describes that it is effective to arrange the thin portions 110 near the end surfaces 61s of the two holding walls 61C when the current collector 60 is joined to the electrode plate end 40P of the positive electrode 3. However, such structure is merely an example. The thin portions 110 may be arranged near the end surfaces 61s of the two holding walls 61C when the current collector 60 is joined to the electrode plate end 40N of the negative electrode 4.

In the above embodiments, the laser beam LB is moved relative to the electrode plate end portions 40 along the scanning pattern a in the zigzagged manner between the end surfaces 61s of the two holding walls 61 holding the electrode plate end portions 40. However, the present disclosure is not limited such a configuration. The laser beam LB may be moved relative to the edge 66 of the electrode plate end portions 40, for example, spirally. Regardless of the scanning pattern a, it is preferred that the laser beam LB be moved in the thickness-wise direction of the electrode plate end portions 40 relative to the electrode plate end portions 40 in order to efficiently heat the edge 66 of the electrode plate end portions 40 and the end surfaces 61s of the two holding walls 61. Thus, the welded portion 71 ensures an appropriate joined state of the current collector 60.

The above embodiments are applied to the electrode body 10 of the rechargeable battery 1 formed by rolling a stack of the positive and negative electrode sheets 35P and 35N arranged with the separator 5 held in between. However, the above embodiments are not limited as such and may be applied to, for example, the current collector 60 joined to the electrode body 10 that is formed by a stack of flat layers. In an example, the electrode body 10 includes a stack of flat layers of electrode sheets 35P and electrode sheets 35N. In this case, the electrode sheets 35P may include the electrode plate end portions 40 overlapping one another in the thickness-wise direction at one end of the electrode body 10.

Further, the electrode sheets 35N may include the electrode plate end portions 40 overlapping one another in the thickness-wise direction at the other end of the electrode body 10.

The above embodiments are applied to the rechargeable battery 1 structured as a lithium-ion rechargeable battery. However, the present disclosure is not limited as such and may be applied to other types of batteries.

The shape of the external terminal is not limited to that shown in FIGS. 1 and 3 to 5 and may be changed. The shape of the case 20 that defines the shape of the rechargeable battery 1 is not limited to the form of a flat box and may be, for example, cylindrical.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A joining method, comprising:
providing an electrode body that includes electrode plate end portions overlapping each other in a thickness-wise direction of the electrode plate end portions;
providing a current collector including a folded portion, wherein the folded portion includes two opposing holding walls that hold the electrode plate end portions of the electrode body in between, and a top portion that connects the two holding walls and includes an opening; and
welding the electrode plate end portions to end surfaces of the two holding walls that define the opening by irradiating an edge of the electrode plate end portions with a laser beam in a state in which the edge of the electrode plate end portions held between the two holding walls projects into the opening, wherein the edge of the electrode plate end portions includes a ridge projecting into the opening, and the ridge increases in projecting amount toward a center of the opening from an end of the opening in a longitudinal direction of the opening that extends along the edge of the electrode plate end portions.

2. The joining method according to claim 1, wherein the electrode plate end portions include a slit at a position where the edge of the electrode plate end portions projects into the opening, the slit extending in a direction in which the edge of the electrode plate end portions projects and opening in a projection end of the edge.

3. The joining method according to claim 1, wherein the two holding walls include thin portions on the end surfaces of the two holding walls that define the opening.

4. The joining method according to claim 1, wherein the welding is performed by moving the laser beam in the thickness-wise direction of the electrode plate end portions relative to the edge of the electrode plate end portions.

5. A joining structure, comprising:
an electrode body that includes electrode plate end portions overlapping each other in a thickness-wise direction of the electrode plate end portions;

a current collector that includes a folded portion, wherein the folded portion includes two opposing holding walls that hold the electrode plate end portions of the electrode body in between, and a top portion that connects the two holding walls and includes an opening; and a welded portion that connects an edge of the electrode plate end portions, held between the two holding walls, to end surfaces of the two holding walls in a state in which the welded portion projects into the opening from the end surfaces of the two holding walls that define the opening, wherein the edge of the electrode plate end portions includes a ridge projecting into the opening, and the ridge increases in projecting amount toward a center of the opening from an end of the opening in a longitudinal direction of the opening that extends along the edge of the electrode plate end portions.

6. The joining structure according to claim 5, wherein the welded portion has an arch-shaped cross section and connects the end surfaces of the two holding walls in a state in which the welded portion covers the edge of the electrode plate end portions projecting into the opening from the end surfaces of the two holding walls that define the opening.

7. The joining structure according to claim 5, wherein a portion where the electrode plate end portions are held between the two holding walls is free from the welded portion.

8. The joining structure according to claim 5, wherein the two holding walls include thin portions on the end surfaces of the two holding walls that define the opening.

9. The joining structure according to claim 5, wherein the electrode plate end portions include a slit at a position where the edge of the electrode plate end portions projects into the opening, the slit extending in a direction in which the edge of the electrode plate end portions projects and opening in a projection end of the edge.

10. A battery comprising:

the joining structure according to claim 5.

* * * * *